United States Patent
Eschenmoser et al.

(10) Patent No.: US 11,378,202 B2
(45) Date of Patent: Jul. 5, 2022

(54) VACUUM VALVE HAVING A PRESSURE SENSOR

(71) Applicant: VAT HOLDING AG, Haag (CH)

(72) Inventors: Adrian Eschenmoser, Grabs (CH); Andreas Hofer, Widnau (CH)

(73) Assignee: VAT HOLDING AG, Haag (CH)

( * ) Notice: Subject to any disclaimer, the term of this patent is extended or adjusted under 35 U.S.C. 154(b) by 0 days.

(21) Appl. No.: 16/627,190

(22) PCT Filed: Jun. 28, 2018

(86) PCT No.: PCT/EP2018/067465
§ 371 (c)(1),
(2) Date: Dec. 27, 2019

(87) PCT Pub. No.: WO2019/002490
PCT Pub. Date: Jan. 3, 2019

(65) Prior Publication Data
US 2020/0166154 A1    May 28, 2020

(30) Foreign Application Priority Data
Jun. 30, 2017 (EP) .................................... 17179074

(51) Int. Cl.
| F16K 37/00 | (2006.01) |
| F16K 3/02 | (2006.01) |
| F16K 3/18 | (2006.01) |
| F16K 31/122 | (2006.01) |
| F16K 51/02 | (2006.01) |

(52) U.S. Cl.
CPC ........ F16K 37/0041 (2013.01); F16K 3/0218 (2013.01); F16K 3/0254 (2013.01); F16K 3/18 (2013.01); F16K 31/122 (2013.01); F16K 51/02 (2013.01)

(58) Field of Classification Search
CPC .. F16K 37/0041; F16K 3/0218; F16K 3/0254; F16K 3/18; F16K 51/02
See application file for complete search history.

(56) References Cited

U.S. PATENT DOCUMENTS

| 3,145,969 A | 8/1964 | Zweck |
| 5,577,707 A | 11/1996 | Brida |
| 6,056,266 A | 5/2000 | Blecha |
| 6,089,537 A | 7/2000 | Olmsted |

(Continued)

FOREIGN PATENT DOCUMENTS

| CN | 101320275 A | 12/2008 |
| CN | 101598232 A | 1/2011 |

(Continued)

OTHER PUBLICATIONS

International Search Report and Written Opinion dated Jun. 28, 2018 in International Application No. PCT/EP2018/067465.

Primary Examiner — Kevin R Barss
(74) Attorney, Agent, or Firm — Muncy, Geissler, Olds & Lowe, P.C.

(57) ABSTRACT

Disclosed is a vacuum valve including a valve closure and a preferably pneumatic or electro-pneumatic drive unit having a pressure medium, said drive unit being coupled to the valve closure. The vacuum valve also has a pressure sensor such that a pressure of the pressure medium can be measured.

18 Claims, 3 Drawing Sheets

(56) References Cited

U.S. PATENT DOCUMENTS

| | | | |
|---|---|---|---|
| 6,289,737 B1 | 9/2001 | Kouketsu | |
| 6,367,770 B1 * | 4/2002 | Duelli | F16K 3/0227 |
| | | | 251/175 |
| 6,416,037 B1 | 7/2002 | Geiser | |
| 6,431,518 B1 * | 8/2002 | Geiser | F16K 51/02 |
| | | | 251/158 |
| 6,629,682 B2 * | 10/2003 | Duelli | F16K 3/18 |
| | | | 251/158 |
| 6,685,163 B2 * | 2/2004 | Blecha | F16K 3/00 |
| | | | 251/328 |
| 7,036,794 B2 * | 5/2006 | Duelli | F16K 3/0254 |
| | | | 137/488 |
| 9,958,349 B2 * | 5/2018 | Schumm | B81C 1/00285 |
| 2005/0067603 A1 | 3/2005 | Lucas et al. | |
| 2010/0116349 A1 * | 5/2010 | Fischer | F16K 3/18 |
| | | | 137/14 |

FOREIGN PATENT DOCUMENTS

| | | |
|---|---|---|
| CN | 103644349 A | 4/2016 |
| DE | 1264191 B1 | 3/1968 |
| DE | 77 31 993 U | 1/1978 |
| DE | 3447008 C2 | 6/1986 |
| DE | 19746241 A1 | 5/1999 |
| DE | 102007034927 A1 | 2/2009 |
| GB | 2192974 A | 1/1990 |
| GB | 2235087 A | 2/1991 |
| JP | H0972458 A | 3/1997 |

* cited by examiner

VACUUM VALVE HAVING A PRESSURE SENSOR

This application is a 371 National Phase of PCT Application No. PCT/EP2018/067465, filed on Jun. 28, 2018; which claims priority to European Patent application 17179074.4 filed Jun. 30, 2017 and each of which is herein incorporated by reference in its entirety.

The invention relates to a vacuum valve having at least one pressure sensor and a method related thereto.

Vacuum valves for regulating a volume or mass flow and/or for essentially gas-tight closing of a flow path leading through an opening formed in a valve housing are generally known from the prior art in various embodiments and are used in particular in vacuum chamber systems in the area of IC, semiconductor or substrate production, which must take place in a protected atmosphere as far as possible without the presence of contaminating particles. Such vacuum chamber systems comprise in particular at least one evacuatable vacuum chamber which is provided for receiving semiconductor elements or substrates to be processed or produced and which has at least one vacuum chamber opening through which the semiconductor elements or other substrates can be guided into and out of the vacuum chamber, and at least one vacuum pump for evacuating the vacuum chamber. For example, in a production plant for semiconductor wafers or liquid crystal substrates, the highly sensitive semiconductor or liquid crystal elements pass sequentially through several process vacuum chambers in which the parts located within the process vacuum chambers are each processed by means of a processing device. Both during the machining process within the process vacuum chambers and during the transport from chamber to chamber, the highly sensitive semiconductor elements or substrates must always be in a protected atmosphere—especially in an airless environment.

For this purpose, peripheral valves are used to open and close a gas inlet or outlet and transfer valves are used to open and close the transfer openings of the vacuum chambers for inserting and removing the parts.

The vacuum valves through which semiconductor parts pass are referred to as vacuum transfer valves due to the area of application described and the associated dimensioning, as rectangular valves due to their mainly rectangular opening cross-section and also as slide valves, rectangular sliders or transfer slide valves due to their normal mode of operation.

Peripheral valves are used in particular to control or regulate the gas flow between a vacuum chamber and a vacuum pump or another vacuum chamber. For example, peripheral valves are located within a pipe system between a process vacuum chamber or a transfer chamber and a vacuum pump, the atmosphere or another process vacuum chamber. The opening cross-section of such valves, also known as pump valves, is generally smaller than that of a vacuum transfer valve. Peripheral valves are also called control valves because, depending on the application, they are not only used to completely open and close an opening, but also to control or regulate a flow by continuously adjusting the opening cross-section between a complete open position and a gas-tight closed position. A possible peripheral valve for controlling or regulating the gas flow is the pendulum valve.

In a typical pendulum valve, as known from U.S. Pat. No. 6,089,537 (Olmsted), the first step is to rotate a normally round valve plate from a position that releases the opening, the open position, to an intermediate position that covers the opening via an opening that is usually also round. In the case of a slide valve, as described for example in U.S. Pat. No. 6,416,037 (Geiser) or U.S. Pat. No. 6,056,266 (Blecha), the valve plate, as well as the opening, is usually rectangular and in this first step is pushed linearly from a position releasing the opening into an intermediate position covering the opening. In this intermediate position, the valve plate of the pendulum or slide valve is located at a distance from and opposite to the valve seat surrounding the opening. In a second step, the distance between the valve plate and the valve seat is reduced so that the valve plate and the valve seat are pressed evenly against each other so that the valve closure reaches a closed position and the opening is closed essentially gas-tight. This second movement preferably occurs in a direction substantially perpendicular to the valve seat. The sealing can, for example, take place either via a sealing ring arranged on the closing side of the valve plate, which is pressed onto the valve seat surrounding the opening, or via a sealing ring on the valve seat, against which the closing side of the valve plate is pressed. Due to the two-step closing process, the sealing ring between the valve plate and the valve seat is subjected to hardly any shear forces that would destroy the sealing ring, as the movement of the valve plate in the second step takes place essentially in a straight line perpendicular to the valve seat.

Various prior art sealing devices are known, for example from the U.S. Pat. No. 6,629,682 B2 (Duelli). A suitable material for sealing rings and seals in vacuum valves is, for example, fluoro rubber, also known as FKM, in particular the fluoroelastomer known under the trade name "Viton", and perfluoro rubber, FFKM for short.

From the prior art, different drive systems are known to achieve the rotational movement of the valve plate of the pendulum valve and the translational movement of the valve plate of the slide valve parallel to the opening and a substantially translational movement perpendicular to the opening, for example from U.S. Pat. No. 6,089,537 (Olmsted) for a pendulum valve and from U.S. Pat. No. 6,416,037 (Geiser) for a slide valve.

The drive unit in this case provides the force or energy required for the movement, for example, by means of an electric motor, which drives the valve closure, for example, via a coupling to an adjustment arm. Pneumatic drive units are also known from the prior art, for example, DE 197 46 241 A1, which have at least one piston-cylinder unit, which is operated using a pressure medium and is coupled to the valve closure.

The valve plate must be pressed against the valve seat in such a way that both the required gas tightness within the entire pressure range is ensured and damage to the sealing medium, in particular the sealing ring in the form of an O-ring, caused by excessive pressure loading is avoided. In order to guarantee this, well-known valves provide for pressure regulation of the valve plate which is regulated depending on the pressure difference prevailing between the two valve plate sides. Especially with large pressure fluctuations or the change from vacuum to overpressure, or vice versa, an even force distribution along the entire circumference of the sealing ring cannot always be guaranteed. In general, the aim is to decouple the sealing ring from support forces resulting from the pressure applied to the valve. In the U.S. Pat. No. 6,629,682 (Duelli), for example, a vacuum valve with a sealing medium is proposed, which consists of a sealing ring and an adjacent support ring, so that the sealing ring is essentially free of support forces.

In order to achieve the required gas tightness, possibly for both positive and negative pressure, some well-known pendulum valves or slide valves additionally or alternatively to the second movement step provide a valve ring which can be displaced perpendicularly to the valve plate, surrounds the opening and is pressed onto the valve plate to close the valve in a gas-tight manner. Such valves with valve rings that can be actively displaced relative to the valve plate are known, for example, from DE 1 264 191 B1, DE 34 47 008 C2, U.S. Pat. No. 3,145,969 (von Zweck) and DE 77 31 993 U. U.S. Pat. No. 5,577,707 (Brida) describes a pendulum valve with a valve housing having an opening and a valve plate that swivels parallel across the opening to control flow through the opening. A valve ring which surrounds the opening can be actively moved vertically in the direction of the valve plate by means of several springs and compressed air cylinders. A possible further development of this pendulum valve is proposed in US 2005/0067603 A1 (Lucas et al.).

Since the valves mentioned above are used, among other things, in the production of highly sensitive semiconductor elements in a vacuum chamber, a corresponding sealing effect must also be reliably guaranteed for such process chambers. For this purpose, the condition of the sealing material or a sealing surface in contact with the sealing material during compression is of particular importance. During the service life of a vacuum valve, wear of the sealing material or the sealing surfaces can typically occur.

Furthermore, the drive system and/or the mechanically moving components of the valve are susceptible to faults. For example, because of appearances of wear or aging or because of external interfering influences such as mechanical shocks or the like, impairments of the piston-cylinder unit of a pneumatic valve drive can occur, for example, in the form of leaks of the piston or an elevated internal friction. Such conditions can result in impairments of the sealing action or the function or reliability of the vacuum valve in general. There has heretofore been no option in the prior art to recognize such faults early and/or beforehand.

In order to maintain the quality of the seal at a constant sufficiently high level, maintenance of the valve therefore typically takes place at specific time intervals, frequently by replacing or restoring parts of the valve, for example, the seal, pneumatic drive parts, or the valve as a whole. Such a maintenance cycle is usually measured by the number of opening and closing cycles to be expected within a certain period. Maintenance is typically carried out as a precaution in order to be able to exclude the occurrence of a leak or other malfunction as far as possible in advance.

One disadvantage of this valve maintenance is the precautionary character thereof. The parts affected by the maintenance are usually restored or replaced before the passage of the regular or actual service life thereof, which means an additional cost expenditure. Moreover, any such maintenance step generally requires a certain shutdown time for a production process and increased technical and financial expenditure. In total this then means a shutdown of the production at intervals which are shorter than required, and more frequently than would be necessary at all.

The invention is therefore based on the object of providing an improved vacuum valve, which allows an optimized operation.

It is a further object of the invention to provide an improved vacuum valve, which allows optimized valve maintenance and thus an improvement, i.e. a shortening of possible process stoppages.

It is a further object of the invention to provide an improved vacuum valve which enables a lengthening of the service life of individual valve parts.

It is a further object of the invention is to provide an improved method for controlling a vacuum valve.

These objects are solved by the realization of the characterizing features of the independent claims. Features which further develop the invention in an alternative or advantageous way can be found in the dependent patent claims.

The basic idea of the present invention is to equip a vacuum valve with a drive unit, which has a pressure medium and is preferably pneumatic or electropneumatic, having a pressure sensor, which enables a pressure measurement of the pressure medium of the drive unit.

The subject matter of the invention is thus a vacuum valve, preferably a vacuum slide valve, pendulum valve, or monovalve, for the regulation of a volume or mass flow and/or for the gas-tight interruption of a flow path, comprising a valve seat which has a valve opening defining an opening axis and a first sealing surface circumferential around the valve opening. The valve seat can be an integral or structural component of the vacuum valve in this case and in particular can embody a part of the valve housing. Alternatively, the valve seat can be formed by the opening of a process chamber, for example, a vacuum chamber, and can form a vacuum valve in the meaning of the present invention in cooperation with the valve closure movable in relation to the valve seat.

Furthermore, the vacuum valve comprises a valve closure, in particular a valve plate, for the regulation of the volume or mass flow and/or for the interruption of the flow path, having a second sealing surface corresponding to the first sealing surface, the variable location of which is determined by a respective position and alignment of the valve closure. Moreover, the vacuum valve has a drive unit coupled to the valve closure comprising at least one piston-cylinder unit comprising at least one piston and one cylinder borehole. The drive unit is preferably a pneumatic or electropneumatic form, but it can also be designed as a hydraulic drive unit. The drive unit furthermore has a pressure medium for application to at least one pressure-active surface of the piston for executing an adjustment movement of the valve closure. By means of the drive unit, the valve closure is thus adjustable from an open position, in which the valve closure and the valve seat are provided without contact in relation to one another, into a closed position, in which an axially sealing contact with respect to the opening axis exists between the first sealing surface and the second sealing surface, in particular via a seal, and the valve opening is thus closed gas-tight, and back again.

One or both of the two sealing surfaces optionally has a seal made of sealing material. The sealing material can be, for example, a polymer-based material (for example, an elastomer, in particular a fluoroelastomer), which is vulcanized onto the sealing surface or is provided as an O-ring in a groove in the valve closure or the valve seat. Sealing surfaces are thus, in the scope of the invention, preferably considered to be those surfaces in which a seal made of sealing material is provided in compressed form to close the valve opening (closed position).

According to the invention, the vacuum valve furthermore comprises at least one pressure sensor, wherein the pressure sensor is designed and arranged such that a pressure measurement of the pressure medium can be carried out.

The vacuum valve according to the invention thus has—preferably in the drive unit and integrated therein, for example, into a pressure medium pipe line or pressure medium hose line of the drive unit—a pressure meter, which measures the pressure of the pressure medium, for example, at specific time intervals. The pressure sensor is preferably designed for the ongoing pressure measurement of the pressure medium, and therefore, for example, a continuous monitoring of the pressure medium pressure takes place.

In addition, the pressure measuring range of the pressure sensor is optionally adapted to the pressure operating range of the drive unit, wherein a reserve for possible irregular pressure deviations is advantageously maintained. The pressure sensor is preferably designed to measure a pressure range between 0 bar and 10 bar, wherein as a further option, the measured pressure is converted into a digital output signal and/or an analog output voltage of preferably 0 to 10 V. A digital output signal is preferably transmitted or relayed in this case via a digital interface (for example, SPI or I2C). Some embodiments relate to a pressure sensor for absolute pressure measurement.

For the pressure measurement, the pressure sensor optionally has a deformable membrane and/or a piezo crystal and/or a quartz and/or piezo resonator. The functional principle of the pressure sensor is thus a mechanical deformation of a membrane by action of the pressure medium (and the detection of the deformation, for example, by induction measurement or capacity measurement), or measurement of an electrical charge or the change thereof due to pressure or force action or measurement of the change of a vibration behavior as a result of pressure action.

In particularly advantageous embodiments of the vacuum valve according to the invention, the pressure sensor is arranged outside a vacuum region, which is defined by the vacuum valve and is separated from an external environment.

The pressure sensor is optionally arranged in the vacuum valve such that at least one input pressure of the piston-cylinder unit is measurable. The vacuum valve is preferably designed such that two or both input pressures of the piston-cylinder unit are measurable. Alternatively or additionally, the pressure sensor (or a further pressure sensor) is arranged in the vacuum valve such that a pressure in at least one chamber, in particular two chambers, of the cylinder is measurable.

In some embodiments, the vacuum valve has two piston-cylinder units for adjusting the valve closure in two different directions, which are in particular substantially orthogonal to one another. Each piston-cylinder unit then preferably has at least one pressure sensor for the respective pressure measurement of the respective pressure medium or the respective piston-cylinder unit or in a respective cylinder (section). Alternatively, the vacuum valve has a ("common") pressure sensor, which is designed for the pressure measurement of both pressure media or both piston-cylinder units, for example, by sequential switching.

In a further refinement, the vacuum valve additionally has a position sensor, which is designed for the in particular ongoing measurement of a position of the valve closure and/or the piston. The position measurement and the pressure measurement are optionally adaptable to one another such that the pressure necessary for adjusting the valve closure and/or the piston out of an idle position, preferably the open position and/or closed position, is determinable. As a further option, the pressure sensor and the position sensor are designed in such a manner that a movement of the valve closure and/or the piston is derivable both on the basis of the pressure measurement and also on the basis of the position measurement. The forces acting on the piston and thus, if its mass and possibly further parameters are known, the movement (to be expected) are derivable from the pressure measurement and the (actual) movement (distance-time characteristic curve) is derivable on the basis of the position, for example. As a further alternative or further addition, the pressure sensor and the position sensor are designed such that a force-distance characteristic curve can be generated on the basis of the pressure measurement and the position measurement. In particular in valves having a seal, a force-distance characteristic curve of the seal is then ascertainable, the analysis of which may permit, for example, possible changes in the sealing material to be recognized.

Furthermore, this position measurement and the mentioned pressure measurement are adapted or adaptable to one another by means of the pressure sensors such that the pressure necessary for adjusting the valve closure out of an idle position, in particular the open and/or closed position, is determinable. It may therefore be determined, for example, by parallel position and pressure measurement, which pressure the drive unit has to build up so that the valve closure moves or begins to move out of the open or closed position.

The valve seat is optionally formed by a part of the vacuum valve structurally connected to the vacuum valve, in particular wherein the valve seat is formed on a housing of the vacuum valve, or is provided by a process chamber, in particular a chamber housing.

In one embodiment, the vacuum valve has a monitoring and control unit for activating the drive unit using predefined control values to adjust the valve closure between the open position and the closed position, wherein the drive unit, the valve closure, and the sensor are designed and interact such that the control values are set based on the measurement signal of the pressure sensor, in particular such that the measurement signal continuously corresponds to a predefined setpoint value.

In this case, the vacuum valve, the sensor arrangement, and the monitoring and control unit are optionally configured, for example, such that the pressure sensor is in one-sided or two-sided communication, for example, via a conventional wired or wireless connection, with the monitoring and control unit for provision and transmission of the measurement signal.

In a further refinement, the vacuum valve furthermore has a processing unit designed such that, for example, in particular provided by the monitoring and control unit or the sensor arrangement, a pressure sensor measurement signal acquired by the processing unit is processable by means of the processing unit and an item of state information of the vacuum valve is ascertained on the basis of the acquired pressure sensor measurement signal. The state information is provided, for example, with respect to a mechanical and/or structural integrity of the valve closure and/or the drive unit, in particular wherein the state information is ascertained by means of an actual-setpoint comparison for the acquired pressure measurement signal, for example, based on an acquired and an expected pressure for a reference setting of the drive unit. Optionally, an output signal is provided based on a comparison of the state information to predefined tolerance values with respect to an evaluation of a process controlled by the vacuum valve, for example, an evaluation of whether a required (sealing) action is achieved or possible damage, for example, to the drive unit or sealing surfaces can be recognized. For example, it can then be indicated to a user by a visual or acoustic signal whether a process runs within the required tolerances or an undesired falling below or exceeding of such a tolerance is to be expected (for example, based on the adjustment velocity or end location).

The present invention moreover comprises a method for controlling a vacuum valve, in particular a vacuum slide valve, pendulum valve, or monovalve, wherein the vacuum valve is designed for the regulation of a volume or mass flow and/or for the gas-tight interruption of a flow path. The vacuum valve to be controlled has a valve seat in this case, which has a valve opening defining an opening axis and a first sealing surface circumferential around the valve opening, a valve closure, in particular a valve plate, for the regulation of the volume or mass flow and/or for the interruption of the flow path, comprising a second sealing surface corresponding to the first sealing surface, the variable location of which is determined by a respective position and alignment of the valve closure. Furthermore, the valve has at least one drive unit, which is coupled to the valve closure and comprises at least one piston-cylinder unit comprising at least one piston and a cylinder borehole, wherein the drive unit furthermore has a pressure medium to be applied to at least one pressure-active surface of the piston, and therefore the valve closure is adjustable from an open position, in which the valve closure and the valve seat are provided without contact in relation to one another, into a closed position, in which, in particular via a seal, an axially sealing contact with respect to the opening axis exists between the first sealing surface and the second sealing surface and the valve opening is thus closed gas-tight, and back. The drive unit is preferably designed as a pneumatic or electropneumatic unit, however, it can also be a hydraulic unit.

According to the invention, a pressure of the pressure medium is measured, in particular in an ongoing manner, in the scope of the method. Optionally, a pressure-dependent digital output signal or a pressure-dependent analog output voltage is generated at the same time. The output voltage is preferably in the range between 0 V and 10 V.

In one refinement of the method, an item of state information of the vacuum valve, in particular with respect to a mechanical and/or structural integrity of the drive unit, is ascertained in the scope of the method based on the pressure measurement, wherein optionally the item of state information is ascertained by means of an actual-setpoint comparison for the acquired measurement signal and/or, based on a comparison of the item of state information to predefined tolerance values, an output signal is provided with respect to an evaluation of a process controlled by the vacuum valve.

In a further refinement, a position measurement, which is coupled to the pressure measurement, of the valve closure and/or the piston additionally takes place in the scope of the method. The pressure required for adjusting the valve closure out of the open and/or closed position is optionally thus determined. As a further option, a derivation or determination of a movement of the valve closure and/or the piston and furthermore a comparison of the two derived movements with respect to possible discrepancies takes place both on the basis of the pressure measurement and also on the basis of the position measurement. For example, on the basis of the acting pressure and thus the force acting on the piston, with knowledge of further parameters, its movement is computed and this computed movement is compared to the movement determined on the basis of the position measurement (position in the time curve). Possible deviations permit, for example, inferences of (parameter) changes of the valve or the drive unit. As a further option for a method with pressure measurement and position measurement, a force-distance characteristic curve is generated on the basis of the pressure measurement and the position measurement, in particular if a force-distance characteristic curve of the seal if a seal is present in the vacuum valve.

The subject matter of the present invention is furthermore a computer program product having program code which is stored on a machine-readable carrier, in particular a control and processing unit of a vacuum valve according to the invention, or a computer data signal, embodied by an electromagnetic wave, for carrying out the method according to the invention.

The present invention thus advantageously provides a vacuum valve which enables an ongoing or continuous pressure measurement of the pneumatic (or hydraulic) drive elements, so that the state of the drive or the adjustment movements or adjustment sequences of the valve can be monitored or checked and possibly evaluated. Furthermore, the pressure measurement enables an automatic and ongoing state verification of the vacuum valve and/or individual ones of its components, for example, the drive unit, the lines thereof, or piston-cylinder units thereof, wherein items of state information can be ascertained or derived not only directly via drive parts, but rather also indirectly via further parts of the vacuum valve, for example, together with a position measurement of the valve closure, an adhesive force of the closure on the valve opening. Faults or irregularities which indicate future faults can only be recognized early or at all in this case, and/or unnecessary maintenance can be avoided because a lack of faults is established. The checks can advantageously take place during the normal process sequences in this case, and therefore they do not have to be interrupted.

The vacuum valve according to the invention is described in more detail below by means of embodiment examples schematically shown in the drawings. The same elements are marked in the figures with the same reference numerals. As a rule, the embodiments described are not to scale and are not to be understood as limitations.

The figures show in detail:

FIGS. 1a,b show a possible first embodiment of a vacuum valve according to invention as a monovalve;

Figure 1A:
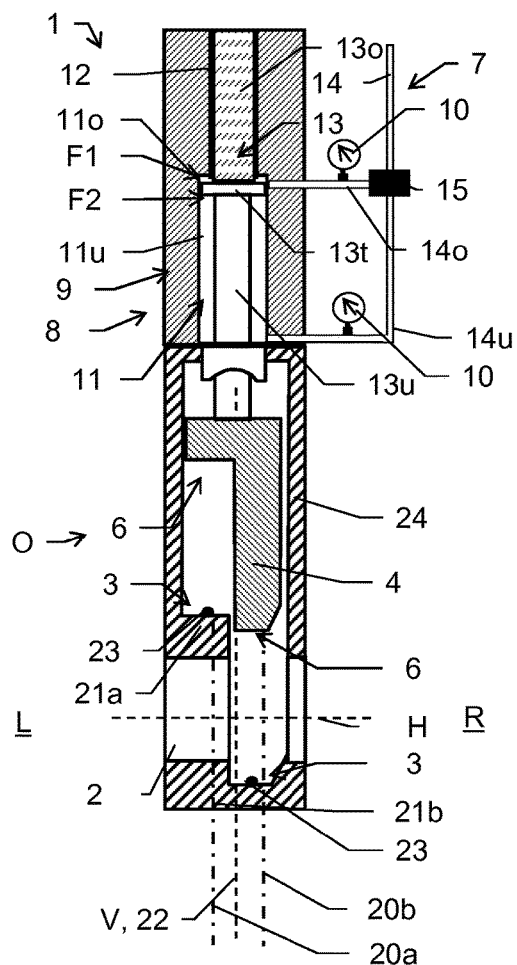
Figure 1B:
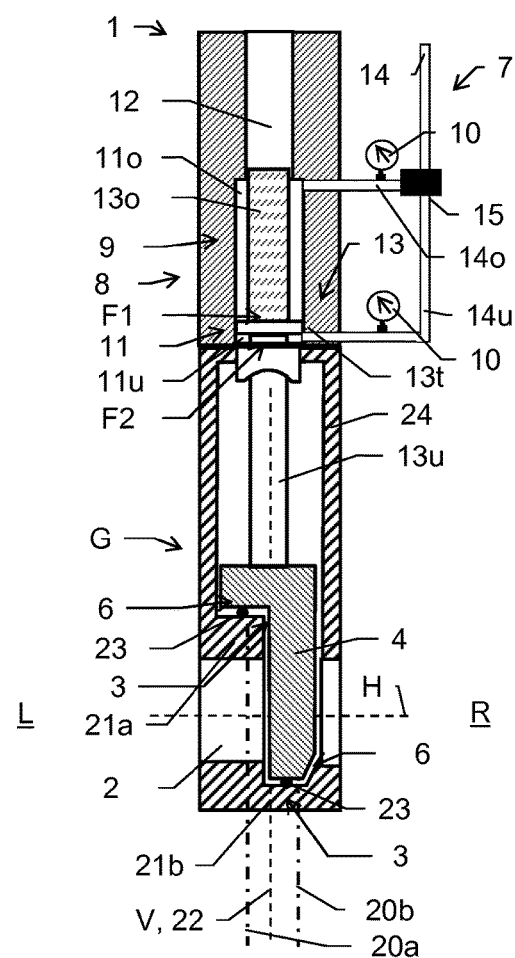

FIGS. 1a, 1b schematically show a first embodiment of a vacuum valve 1 according to the invention. In the example, valve 1 is designed as a so-called monovalve and shown in cross-section in an open position O (FIG. 1a) and a closed position G (FIG. 1b).

The valve 1 for the gas-tight closing of a flow path by means of a linear movement has a valve housing 24 with an opening 2 for the flow path, wherein opening 2 has a geometric opening axis 5 along the flow path. The opening 2 connects a first gas area L, which is located in the drawing to the left of valve 1 or a partition wall (not shown), with a second gas area R to the right of it. Such a partition wall is formed, for example, by a chamber wall of a vacuum chamber.

A valve closure 4 is displaceable linearly along a geometric adjustment axis V, which extends transversely to the opening axis H, in a closure element plane 22 from an open position O, which releases the opening 2, into a closed position G, which is pushed linearly over the opening 2, in a closing direction and vice versa back in an opening direction (opposite to the closing direction) by means of a drive unit 7.

In the example, a curved first sealing surface 3 encloses the opening 2 of the valve housing 24 along a first section 21a in a first plane 20a and along a second section 21b in a second plane 20b. The first plane 20a and the second plane 20*b* are spaced apart from one another, extend parallel to one another, and extend parallel to the closure element plane 22. The first section 21*a* and the opposing second section 21*b* therefore have a geometric offset in relation to one another transversely to the adjustment axis V and in the direction of the opening axis H. The opening 2 is arranged between the two opposing sections 21*a* and 21*b* in the region extending along the adjustment axis V.

The closure element 4 has a second sealing surface 6, which extends along sections corresponding to the first and second sections 21*a*, 21*b* and corresponds to the first sealing surface 3. In the example, the first sealing surface 3 has a sealing material 23. This seal 23 can be, for example, vulcanized as a polymer by means of vulcanization onto the valve seat. Alternatively, the seal 23 can be embodied, for example, as an O-ring in a groove of the valve seat. A sealing material can also be adhesively bonded onto the valve seat and thus embody the seal 23. In an alternative embodiment, the seal 23 can be arranged on the side of the valve closure 4, in particular on the second sealing surface 6. Combinations of these embodiments are also conceivable. Such seals 23 are, of course, not restricted to the valve 1 described in the example, but rather are also applicable in the further described valve embodiments or the modifications or combinations thereof with one another.

Monovalves, i.e., vacuum valves closable by means of a single linear movement, have the advantage, for example, of a comparatively simple closing mechanism, for example, compared to the transfer valves closable by means of two movements, which require a comparatively complexly constructed drive. Since the closure element can moreover be formed in one piece, it can be subjected to high acceleration forces, and therefore this valve can also be used for rapid and emergency closures. The closing and sealing can take place by means of a single linear movement, and therefore very rapid closing and opening of the valve 1 is possible.

In particular, one advantage of monovalves is, for example, that the seal 3, 6, because of its profile during closing, is not subjected to a transverse load in the transverse direction in relation to the longitudinal extension of the seal 3, 6. On the other hand, the seal 3, 6 is hardly capable, because of its transverse extension in relation to the opening axis H, of absorbing forces occurring on the closure element 4 along the opening axis H, which can act on the closure element 4 in particular in the case of large differential pressure, which requires a robust construction of the closure element 4, its drive, and its mounting.

The drive unit 7 is designed in the example as an (electro-)pneumatic drive unit 7 comprising a piston-cylinder unit 8. Alternatively, the drive unit 7 is a hydraulic drive unit. The drive unit 7 and/or the piston-cylinder unit 8 has a two-step cylinder borehole 9, wherein the "lower" section 11 (in the drawing) of the borehole 9 has a larger diameter than the "upper" section 12. A piston 13 is mounted in the cylinder 9 so it is displaceable along the adjustment axis V, which has a piston rod 13*u* and 13*o* in each case on both sides, which adjoin one another by way of a plate 13*t*, and therefore pressure-active surfaces F1 and F2 are provided. The "lower" piston section 11 is divided by the plate 13*t* into two chambers 11*o* and 11*u*, which are of different sizes depending on the position of the piston 13 in the cylinder 9. The piston-cylinder unit 8 has seals, however, they are not shown here for reasons of comprehensibility. Such seals are provided on the piston 13 and also in and on the feed-throughs for the piston rods 13*u* and 13*o*.

A pressure medium is applied to the piston-cylinder unit 8 via a pressure medium line 14. In the example, the pressure medium is compressed air. Depending on the embodiment, however, other gaseous or liquid pressure media suitable for vacuum valves can be used. This pressure medium line 14 leads via an "upper" line branch 14*o* into the lower section 11 of the cylinder borehole 9, which discharges therein above the active piston surface F1 into the upper chamber 11*o*. Furthermore, a "lower" line branch 14*u* is connected to the pressure medium line 14. This line branch 14*u* also leads into the lower part of the section 11 of the cylinder borehole 9, where it discharges therein below the pressure-active piston surface F2 into the lower chamber 11*u*. The pressure-active surface F1 can therefore be impinged by means of a switching valve 15, for example, a 3/2-way switching valve, via the one line branch 14*o*, and by corresponding switching of the switching valve 15, the pressure-active surface F2 can be impinged via the other line branch 14*u*, wherein the respective line branch which is not used for the impingement is accordingly switched to venting. Therefore, by impinging the surface F1, the piston 13 and thus the valve closure 4 is movable "downward" from the open position O shown in FIG. 1*a*, and therefore the closed position G shown in FIG. 1*b* is reached. By switching over the switching valve 15, the surface F2 is impinged and the movement is thus reversed, and therefore the vacuum valve 1 opens. Alternatively to the illustrated form having impingement of the piston on both sides, for example, embodiments are also possible in which one movement direction is implemented by means of a restoring element such as a spring.

According to the invention, the vacuum valve 1 comprises at least one pressure sensor 10, in the example, two pressure sensors 10. One of the two pressure sensors 10 is integrated in this case into the "upper" line branch 14*o*, and the other pressure sensor 10 into the "lower" line branch 14*u*. The respective pressure in the line branches 14*o*, 14*u* or the two input pressures of the piston-cylinder unit 8 are measured by means of these pressure sensors 10. The pressure measurement advantageously takes place in an ongoing manner in this case, and therefore monitoring of the input pressures is enabled and possibly or optionally a warning signal can be output upon exceeding or falling below a limiting value.

The pressure meter or meters 10 are designed in this case, for example, as resistive, capacitive, or inductive membrane pressure meters, as a piezo crystal pressure meters, or as quartz or piezo resonator pressure meters. The respective pressure meter is preferably designed to measure pressures between 0 and 10 bar and/or for absolute pressure measurement. The measured pressure is converted, for example, into a voltage between 0 and 10 V and this voltage is used for the pressure display or is supplied to a data storage system and/or analysis unit. The pressure sensor 10 or the piston-cylinder unit 8 is optionally arranged outside the vacuum region in this case, which reduces the demands on the technical design thereof and thus simplifies it.

A drive unit 7 according to the invention or a vacuum valve 1 according to the invention comprising a pressure meter 10 for the pressure measurement of the pressure medium can, alternatively to the illustration, of course, also be designed to generate an at least substantially rotational adjustment movement of the valve closure 4 instead of or in addition to the linear adjustment movement shown and/or to generate a combination of a linear movement with a rotational movement.

Figure 2:
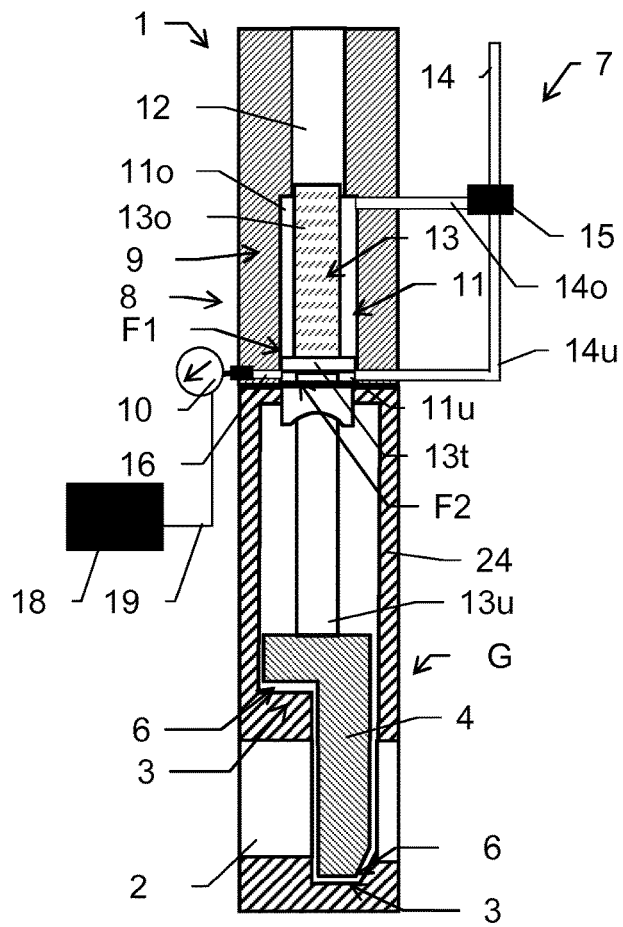
FIG. 2 shows a possible second embodiment of a vacuum valve according to the invention as a monovalve.

FIG. 2 shows a schematic diagram in cross-section of an alternative embodiment according to the invention of a monovalve 1, wherein the valve 1 is illustrated in the closed position G. In contrast to the embodiment according to FIGS. 1*a*, 1*b*, the valve 1 only has one pressure sensor 10, which is not integrated into the pressure lines 14o or 14u, but rather is arranged such that the pressure in the lower chamber 11u of the cylinder 9 is measurable. For this purpose, the pressure meter 10 is attached in the example to the housing wall 24 and is connected via an opening 16 in the wall 24 to the chamber 11u, and therefore its pressure can be measured by the sensor 10. Alternatively to the illustrated embodiment, the valve 1 has a pressure sensor 10 for each of the two chambers 11u and 11o or the one pressure sensor 10 is alternately connected to one of the two chambers 11o and 11u at a time, for example, with the aid of an additional switching valve, and alternately measures the respective chamber pressure, for example, the pressure of the "lower" chamber 11u upon the change from the closed position G to the open position O and, vice versa, the pressure of the "upper" chamber 11o upon the adjustment from the open position O to the closed position G.

In the example, the pressure sensor 10 is connected via a data line 19 to an electronic processing unit 18, and therefore the measurement data of the sensor 10 (for example, voltage values) may be acquired, stored, and analyzed by the processing unit 18. The processing unit 18 is an external unit or, preferably, a unit integrated into the vacuum valve 1. Instead of a data cable 19, pressure sensor 10 and the analysis unit 18 are designed for wireless data transmission, for example, via radio, Wi-Fi, or Bluetooth, which is advantageous in particular in the case of a (large) spatial separation of analysis unit 18 and pressure sensor 10.

The data processing unit 18 is designed in this case in the example to process the acquired measurement signals of the pressure sensor 10 and to ascertain an item of state information of the vacuum valve 1 on the basis of the measurement signal or signals. The item of state information preferably relates to a mechanical and/or structural integrity of the valve closure 4 and/or the drive unit 7, for example, with respect to appearances of aging, wear effects, or a leak-tightness of the drive unit 7 or the piston-cylinder unit 8. The item of state information is ascertained in this case as an option by means of an actual-setpoint comparison of one or more pressure sensor measurement signals, i.e., by establishing deviations from a reference signal value. As a further option, a comparison is performed in this case to one or more preset tolerance values. If the tolerance value is fallen below or exceeded, an output signal can be output in this case. Deviations or exceeding the limiting value can be indications in this case of disturbances or faults in the vacuum valve 1 and in particular can be used to indicate them very early, even before impairments of the actual function of the valve 1 occur, or also disturbances or faults of the gas regions or vacuum chambers controlled by the valve 1.

Figure 3:
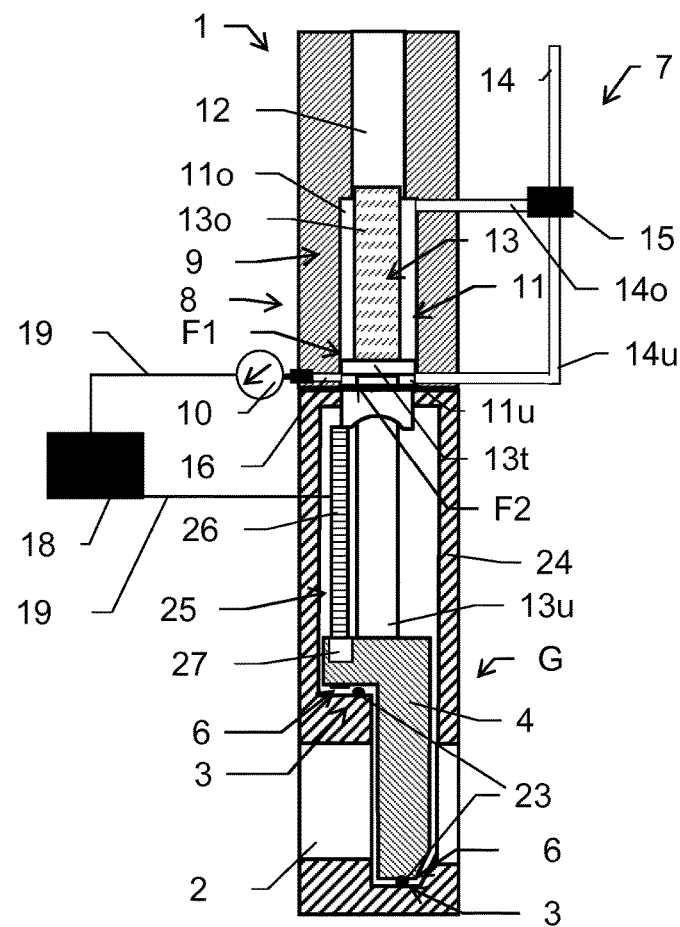
FIG. 3 shows a possible further embodiment of a vacuum valve according to the invention as a monovalve.

FIG. 3 shows a refinement of the vacuum valve 1 according to FIG. 2. In the present example, the valve 1 additionally has a position sensor 25 comprising a scanning ruler 26, which is arranged fixedly in the vacuum valve 1 such that it acquires a target 27, which is arranged on the valve closure 4 and is adjustable with it. The position sensor 25 thus measures, preferably in an ongoing manner, the position of the valve closure 4 inside the valve 1. The measurement signal of the position sensor 25 is supplied, like that of the pressure sensor 10, to the analysis unit 18 by means of data cable 19.

The position measurement and the pressure measurement are adapted to one another in this case (for example, simply by ongoing measurements with sufficiently high cycle rate, and therefore at least quasi-synchronous acquisition of the pressure and the position takes place or by means of a trigger for triggering the two measured value recorders 10 and 25) and/or the analysis unit 18 is configured such that the pressure measured values are (chronologically) correlated with the position measured values. Thus, for example, it may be established as an item of state information which pressure has to be built up (in the respective pressure line 14o, 14u or the respective chamber 11o, 11u) before the piston 13 (and thus the valve closure 4) begins to move. Therefore, for example, inferences are possible about the adhesive friction in the cylinder 9 and/or in the case of longer, preferably automatic chronological monitoring of the required minimum adjustment pressure, possible changes in the course of time can be established. If it is established, for example, that the minimum pressure required for the adjustment or opening and/or closing of the valve 1 increases in the course of time, this can be an indication of appearances of wear in the valve 1 and an output signal can be output by the analysis unit 18, which notifies of required maintenance.

If the vacuum valve 1 has a seal 23 as in the example, a force-distance characteristic curve can be prepared especially for the seal 23 in this case on the basis of the pressure measurement and the position measurement (for example, simply as a detail of a force-distance characteristic curve for the entire closing or opening movement). A characteristic elastomer characteristic curve is then provided. Its analysis, above all the observation of possible changes of the characteristic curve in the course of time, permits inferences, for example, about appearances of aging or wear of the seal 23.

It results as a further advantage of a combined pressure and position measurement that the movement to be expected as a result of the measured pressure on the piston 13 (and thus the force acting on the piston 13) can be compared to its actual movement, which is provided with the position measurement. For this purpose, a pressure measurement takes place in both chambers 11o and 11u for the valve 1, for example, notwithstanding the illustration of FIG. 3, and therefore the forces acting on the piston 13 are accurately known. If discrepancies of the (quasi-theoretical) movement derived therefrom (and from knowledge of the mass of the piston 13 and the closure 4, etc.) from the movement which can be established from the position measurement are recognizable, for example, additionally acting external forces or unexpected friction in the drive unit can thus be concluded therefrom.

Figure 4:
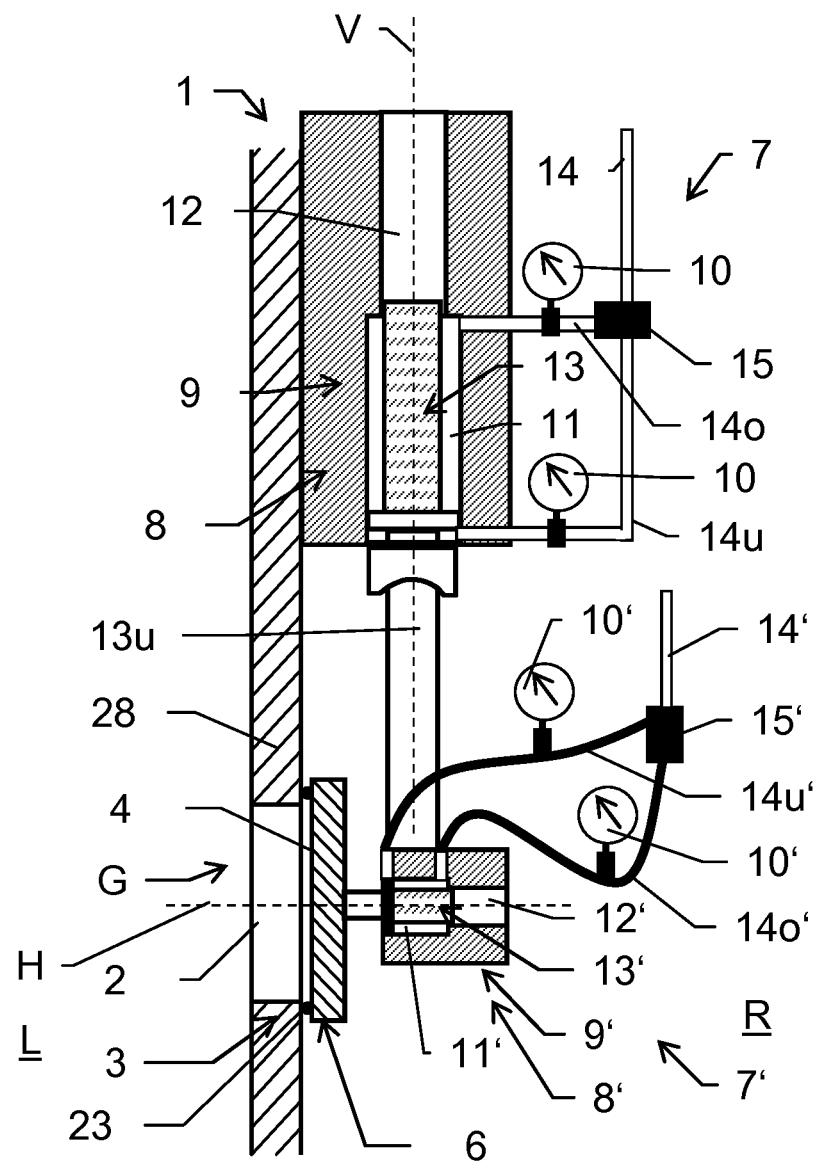
FIG. 4 shows a schematic illustration of a further embodiment according to the invention of a vacuum valve as a transfer valve.

FIG. 4 shows a further embodiment according to the invention of a vacuum valve 1, which is designed in the example as a transfer valve, illustrated in the closed position G.

The transfer valve shown is a special form of a slide valve. The vacuum valve has a rectangular, plate-shaped closure element 4 (for example, valve plate), which has a sealing surface 6 for the gas-tight closing of an opening 2. The opening 2 has a cross-section corresponding to the closure element 4 and is formed in a wall 28. The opening 2 is enclosed by a valve seat, which in turn also provides a sealing surface 3 corresponding to the sealing surface 6 of the closure element 4. The sealing surface 6 of the closure element 4 is circumferential around the closure element 4 and has a sealing material (seal) 23. In a closed position G, the sealing surfaces 6, 3 are pressed against one another and the sealing material 23 is compressed at the same time.

The opening 2 connects a first gas region L, which is located on one side of the wall 28, to a second gas region R on the other side of the wall 28. The wall 28 is formed, for example, by a chamber wall of a vacuum chamber. The vacuum valve 1 is then formed by an interaction of the chamber wall 28 with the closure element 4.

The vacuum valve 1 has a first drive unit 7 and a second drive unit 7', wherein in the example, both drive units 7, 7' are designed as pneumatic drive units. The closure element 4 is arranged via a second piston-cylinder unit 8' of the second pneumatic drive unit 7' at the lower end 13u of the piston 13 of the first drive unit 7. The first drive unit 7 ensures the "vertical" movement of the valve closure 4 (i.e., the adjustment along the "vertical" adjustment axis V), the second drive unit 7', which has the same structure in principle as the first drive unit 7, ensures its "horizontal" movement (adjustment along the "horizontal" adjustment axis H).

In the open position O (not shown), the closure element 4 is located outside the projection region of the opening 2 and releases it completely. By adjusting the piston 13 in the axial direction parallel to the first, "vertical" adjustment axis V and parallel to the wall 28, the closure element 4 can be adjusted by means of the drive unit 7 from the open position O into an intermediate position. In this intermediate position, the cover surface 6 of the closure element 4 overlaps the opening 2 and is located in a position spaced apart opposite to the sealing surface 3 of the valve seat enclosing the opening 2.

By adjusting the piston 13' of the second drive unit 7' in the direction of the second, "horizontal" adjustment axis H (transversely to the first adjustment axis V), i.e., for example, perpendicularly to the wall 28 and to the valve seat, the closure element 4 can be adjusted from the intermediate position into the illustrated closed position G.

In the closed position G, the closure element 4 closes the opening 2 in a gas-tight manner and thus separates the first gas region L from the second gas region R in a gas-tight manner.

The opening and closing of the vacuum valve thus takes place by means of the drive units 7 and 7' by way of an L-shaped movement in two directions H, V perpendicular to one another of the closure element 4. The transfer valve shown is therefore also called an L-type valve.

A transfer valve 1 as shown is typically provided for sealing a process volume (vacuum chamber) and for loading and unloading the volume. Frequent changes between the open position and the closed position G are the rule in the case of such a use. Increased appearances of wear of the sealing surfaces 6, 3 and the mechanically moved components, for example, the seals of the respective piston-cylinder unit 8, 8' or other parts of the drive units 7, 7' can thus occur.

According to the invention, the vacuum valve 1 has pressure meters 10 and 10' both for the "vertical" and also the "horizontal" drive system, whereby the pressure of the respective pressure medium is measured. In the example of present FIG. 4, the pressure meters 10, 10' are integrated in this case, similarly to the embodiment according to FIGS. 1a, 1b, into the respective pipe lines 14o, 14u or hose lines 14o' and 14u', which supply the respective cylinders 9 and 9'. The pressure (for example, input pressures or pressures in the respective cylinders 9, 9' or the respective chambers thereof) of both the "horizontal" and also the "vertical" drive unit 7' and 7, respectively, may therefore advantageously be measured or monitored by way of a transfer valve 1 designed in this manner.

Instead of two separate drive units 7, 7' as shown, one drive unit can also be used, which has, for example, two piston-cylinder units 8, 8', which are supplied via a common compressed air line system, as described in one possible form, for example, in DE 197 46 241 A1. In such embodiments, a pressure measurement possibly then takes place using fewer than four pressure sensors 10, 10', for example, using two pressure sensors, which sequentially measure the respective pressure of the respective "vertical" or "horizontal" drive subunit.

It is understood that these figures only schematically represent possible embodiment examples. The different approaches can also be combined with each other as well as with devices and methods according to the prior art, for example, with a so-called pendulum valve.

The invention claimed is:

1. A vacuum valve, for regulating a volume or mass flow and/or for gas-tight interruption of a flow path, comprising:
   a valve seat which has a valve opening defining an opening axis (H) and a first sealing surface surrounding the valve opening,
   a valve closure for regulating the volume or mass flow and/or for interrupting the flow path, having a second sealing surface corresponding to the first sealing surface, the variable location of which second sealing surface is determined by a respective position and alignment of the valve closure,
   at least one drive unit, which is coupled to the valve closure, comprising at least one piston-cylinder unit comprising at least one piston and a cylinder borehole, wherein the drive unit furthermore has a pressure medium to be applied to at least one pressure-active surface (F1, F2) of the piston, so that by means of the drive unit,
   wherein the valve closure is adjustable from an open position (O), in which the valve closure and the valve seat are present without contact relative to one another, into a closed position (G), in which an axially sealing contact with respect to the opening axis (H) exists between the first sealing surface and the second sealing surface via an interposed seal and the valve opening is thereby closed in a gas-tight manner, and back again,
   wherein the vacuum valve furthermore comprises at least one pressure sensor, and
   wherein the pressure sensor is designed and arranged such that a pressure measurement of the pressure medium can be carried out.

2. The vacuum valve according to claim 1, wherein the drive unit has at least one hose line or pipe line where the pressure sensor is integrated into the hose line or pipe line.

3. The vacuum valve according to claim 1, wherein the pressure sensor is designed to measure the ongoing pressure of the pressure medium and/or a pressure range between 0 and 10 bar and/or an absolute pressure.

4. The vacuum valve according to claim 1, wherein the pressure sensor has a deformable membrane and/or a piezo crystal and/or a quartz and/or piezo resonator for the pressure measurement.

5. The vacuum valve according to claim 1, wherein the pressure sensor is arranged outside a vacuum region, which is defined by the vacuum valve and is separated from an external environment, and/or the valve seat is formed by a part of the vacuum valve structurally connected to the vacuum valve or is provided by a process chamber.

6. The vacuum valve according to claim 1, wherein the pressure sensor is arranged in the vacuum valve such that at least one input pressure of the piston-cylinder unit is measurable and/or a pressure in at least one chamber of the cylinder borehole is measurable.

7. The vacuum valve according to claim 1, wherein the vacuum valve has two piston-cylinder units for adjusting the valve closure in two different directions, which are substantially orthogonal to one another, wherein each piston-cylinder unit has at least one pressure sensor for the respective pressure measurement.

8. The vacuum valve according to claim 1, wherein the vacuum valve additionally has a position sensor, which is designed for the measurement of a position of the valve closure and/or the piston.

9. The vacuum valve according to claim 8, wherein the position measurement and the pressure measurement are adaptable to one another such that the pressure necessary for adjusting the valve closure and/or the piston from an idle position is determinable, and/or the pressure sensor and the position sensor are designed such that a movement of the valve closure and/or the piston is derivable both on the basis of the pressure measurement and on the basis of the position measurement, and/or the pressure sensor and the position sensor are designed such that a force-distance characteristic curve can be generated on the basis of the pressure measurement and the position measurement.

10. The vacuum valve according to claim 1, wherein the vacuum valve has a processing unit designed such that an acquired pressure sensor measurement signal can be processed by means of the processing unit and an item of state information of the vacuum valve is ascertained on the basis of the acquired pressure sensor measurement signal.

11. The vacuum valve according to claim 10, wherein the item of state information is provided with respect to a mechanical and/or structural integrity of the valve closure and/or the drive unit.

12. The vacuum valve according to claim 10, wherein based on a comparison of the item of state information to predefined tolerance values, an output signal is provided with respect to an evaluation of a process controlled by the vacuum valve.

13. The vacuum valve according to claim 1, wherein the at least one pressure sensor is arranged in the drive unit.

14. A method for controlling a vacuum valve wherein the vacuum valve is designed for the regulation of a volume or mass flow and/or for the gas-tight interruption of a flow path and the vacuum valve, comprising:
 a valve seat, which has a valve opening defining an opening axis (H) and a first sealing surface circumferential around the valve opening,
 a valve closure for the regulation of the volume or mass flow and/or for the interruption of the flow path, comprising a second sealing surface corresponding to the first sealing surface, the variable location of which second sealing surface is determined by a respective position and alignment of the valve closure,
 at least one drive unit, which is coupled to the valve closure, comprising at least one piston-cylinder unit comprising at least one piston and a cylinder borehole,
 wherein the drive unit furthermore has a pressure medium to be applied to at least one pressure-active surface (F1, F2) of the piston, such that the valve closure is adjustable by means of the drive unit, from an open position (O), in which the valve closure and the valve seat are provided without contact in relation to one another, into a closed position (G), in which an axially sealing contact with respect to the opening axis (H) exists between the first sealing surface and the second sealing surface and the valve opening is thus closed gas-tight, and back again, wherein in the scope of the method a pressure of the pressure medium is measured.

15. The method according to claim 14, wherein an item of state information of the vacuum valve is ascertained based on the pressure measurement,
 wherein the item of state information is ascertained by means of an actual-setpoint comparison for an acquired pressure measurement signal and/or based on a comparison of the item of state information to predefined tolerance values, an output signal is provided with respect to an evaluation of a process controlled by the vacuum valve.

16. The method according to claim 14, wherein in addition a position measurement, which is coupled to the pressure measurement, of the valve closure and/or the piston takes place,
 wherein on the basis of the pressure measurement and the position measurement, the pressure necessary for adjusting the valve closure and/or the piston from the open position (O) and/or closed position (G) is determined, and/or both on the basis of the pressure measurement and also on the basis of the position measurement, a movement of the valve closure and/or the piston is derived and a comparison of the two derived movements with respect to possible discrepancies takes place, and/or on the basis of the pressure measurement and the position measurement, a force-distance characteristic curve is generated.

17. A computer program product having program code which is stored on a control and processing unit of a vacuum valve for carrying out the method according to claim 14.

18. The method according to claim 14, wherein a pressure-dependent digital output voltage or a pressure-dependent output voltage is generated in the range between 0 V and 10 V.

* * * * *